(12) United States Patent
Gerard et al.

(10) Patent No.: US 11,223,265 B2
(45) Date of Patent: Jan. 11, 2022

(54) COMPACT HALBACH ELECTRICAL GENERATOR WITH COILS ARRANGED CIRCUMFERENTIALLY

(71) Applicants: LUXEMBOURG INSTITUTE OF SCIENCE AND TECHNOLOGY (LIST), Esch-sur-Alzette (LU); LUXEMBOURG PATENT COMPANY S.A., Lintgen (LU)

(72) Inventors: Mathieu Gerard, Rehon (FR); Jérôme Polesel Maris, Mexy (FR)

(73) Assignees: Luxembourg Institute of Science and Technology (LIST), Luxembourg (LU); Rotarex S.A., Luxembourg (LU)

( * ) Notice: Subject to any disclaimer, the term of this patent is extended or adjusted under 35 U.S.C. 154(b) by 24 days.

(21) Appl. No.: 16/771,353

(22) PCT Filed: Dec. 12, 2018

(86) PCT No.: PCT/EP2018/084603
§ 371 (c)(1),
(2) Date: Jun. 10, 2020

(87) PCT Pub. No.: WO2019/115633
PCT Pub. Date: Jun. 20, 2019

(65) Prior Publication Data
US 2020/0343801 A1    Oct. 29, 2020

(30) Foreign Application Priority Data

Dec. 13, 2017    (LU) .......................................... 100555

(51) Int. Cl.
*F03B 13/00*    (2006.01)
*H02P 9/04*    (2006.01)
(Continued)

(52) U.S. Cl.
CPC ............. *H02K 21/24* (2013.01); *F03B 13/00* (2013.01); *F16K 51/00* (2013.01); *H02K 7/083* (2013.01); *H02K 7/1823* (2013.01)

(58) Field of Classification Search
CPC ........... F03B 13/00; F16K 51/00; H02K 2/24; H02K 7/083; H02K 7/1823
See application file for complete search history.

(56) References Cited

U.S. PATENT DOCUMENTS 2,719,931 A * 10/1955 Kober .................... H02K 21/24
                                                     310/156.49
5,684,352 A * 11/1997 Mita ........................ H02K 1/02
                                                     310/152
(Continued)

FOREIGN PATENT DOCUMENTS

JP    H01136546 A    5/1989
JP    2017135811 A    8/2017
(Continued)

OTHER PUBLICATIONS

International Search Report for PCT/EP2018/084603 dated Feb. 13, 2019.
Written Opinion for PCT/EP2018/084603 dated Feb. 13, 2019.

*Primary Examiner* — Tulsidas C Patel
*Assistant Examiner* — Thomas K Quigley
(74) *Attorney, Agent, or Firm* — Sandberg Phoenix and von Gontard

(57) ABSTRACT

An electric generator comprising a rotor housing; a rotor mounted in the rotor housing, with two opposed main faces; permanent magnets circumferentially arranged in front of one of the main faces of the rotor; coils circumferentially arranged in front of the other one of the main faces of the rotor; the rotor being configured for, upon rotation, vary a magnetic flux through the coils produced by the permanent magnets, so as to generate electromotive forces in said coils;

(Continued)

wherein the coils are arranged outside of the rotor housing. Also a valve for gas cylinder, equipped with a corresponding electric generator.

19 Claims, 7 Drawing Sheets

(51) Int. Cl.
*H02K 21/24* (2006.01)
*F16K 51/00* (2006.01)
*H02K 7/08* (2006.01)
*H02K 7/18* (2006.01)

(56) References Cited

U.S. PATENT DOCUMENTS

| | | | | |
|---|---|---|---|---|
| 5,760,506 | A * | 6/1998 | Ahlstrom | F16C 32/0438 310/74 |
| 5,955,809 | A * | 9/1999 | Shah | H02K 21/24 310/198 |
| 6,011,334 | A * | 1/2000 | Roland | H02K 7/11 290/43 |
| 6,097,118 | A * | 8/2000 | Hull | H02K 1/141 310/156.32 |
| 6,140,730 | A * | 10/2000 | Tkaczyk | H02K 21/24 310/181 |
| 6,750,588 | B1 * | 6/2004 | Gabrys | F16C 39/063 310/113 |
| 7,105,975 | B2 * | 9/2006 | Semones | H02K 21/24 310/216.008 |
| 7,723,860 | B2 * | 5/2010 | Nagler | F03B 13/105 290/54 |
| 7,777,391 | B2 * | 8/2010 | Asano | H02K 1/148 310/268 |
| 7,956,480 | B2 * | 6/2011 | Onodera | H02K 21/12 290/54 |
| 8,558,424 | B2 * | 10/2013 | Auten | H02K 1/278 310/90.5 |
| 8,847,424 | B2 * | 9/2014 | Rebsdorf | F03D 13/20 290/55 |
| 9,046,071 | B2 * | 6/2015 | Portolan | H02K 7/1823 |
| 9,166,458 | B1 * | 10/2015 | Burns, III | F01D 15/10 |
| 9,243,604 | B2 * | 1/2016 | Montgomery | F03B 13/00 |
| 9,583,993 | B1 * | 2/2017 | Kaiser | H02K 7/088 |
| 10,014,749 | B2 * | 7/2018 | Miyake | H02K 1/2753 |
| 10,227,860 | B1 * | 3/2019 | McMullen | F04D 13/10 |
| 10,458,554 | B2 * | 10/2019 | Gattavari | F03B 11/004 |
| 10,476,360 | B2 * | 11/2019 | Hunter | H02K 7/086 |
| 2005/0029900 | A1 * | 2/2005 | Hiramatsu | H02K 21/145 310/268 |
| 2005/0073212 | A1 * | 4/2005 | Semones | H02K 21/24 310/216.008 |
| 2006/0043738 | A1 * | 3/2006 | Roos | F03B 3/103 290/54 |
| 2007/0029889 | A1 * | 2/2007 | Dunn | H02K 21/38 310/156.43 |
| 2007/0145751 | A1 * | 6/2007 | Roos | F03B 3/04 290/52 |
| 2007/0188036 | A1 * | 8/2007 | Shibukawa | H02K 7/12 310/113 |
| 2008/0136191 | A1 * | 6/2008 | Baarman | F03B 3/04 290/54 |
| 2008/0217926 | A1 * | 9/2008 | Lemieux | H02K 35/02 290/1 R |
| 2008/0284174 | A1 * | 11/2008 | Nagler | H02K 7/1823 290/54 |
| 2009/0278358 | A1 * | 11/2009 | Lemieux | F03B 13/20 290/53 |
| 2010/0123426 | A1 * | 5/2010 | Nashiki | H02K 1/12 318/701 |
| 2010/0230969 | A1 * | 9/2010 | Peleg | H02K 7/11 290/50 |
| 2010/0270803 | A1 * | 10/2010 | Irwin | H02K 7/1823 290/54 |
| 2011/0012458 | A1 * | 1/2011 | Atallah | H02K 7/11 310/103 |
| 2011/0221197 | A1 * | 9/2011 | Peleg | F16L 55/02 290/52 |
| 2011/0241460 | A1 * | 10/2011 | Mebarki | H02K 9/22 310/64 |
| 2013/0134815 | A1 * | 5/2013 | Powell | H02K 21/38 310/101 |
| 2013/0154272 | A1 * | 6/2013 | Rebsdorf | F03D 9/25 290/55 |
| 2013/0161959 | A1 * | 6/2013 | Rebsdorf | F03D 80/70 290/55 |
| 2015/0076825 | A1 * | 3/2015 | Wyatt, II | H02K 1/278 290/52 |
| 2020/0136451 | A1 * | 4/2020 | Zeichfussl | F03D 80/60 |
| 2021/0249920 | A1 * | 8/2021 | Sugiura | H02K 29/03 |

FOREIGN PATENT DOCUMENTS

| | | |
|---|---|---|
| WO | 2001047765 A1 | 7/2001 |
| WO | 2008022766 A1 | 2/2008 |
| WO | 2011061491 A2 | 5/2011 |
| WO | 2014151672 A1 | 9/2014 |

* cited by examiner

COMPACT HALBACH ELECTRICAL GENERATOR WITH COILS ARRANGED CIRCUMFERENTIALLY

CROSS-REFERENCE TO RELATED APPLICATIONS

The present invention is the US national stage under 35 U.S.C. § 371 of International Application No. PCT/EP2018/084603, which was filed on Dec. 12, 2018, and which claims the priority of application LU 100555 filed on Dec. 13 2017, the content of which (text, drawings and claims) are incorporated here by reference in its entirety.

FIELD

The invention is directed to the field of electrical generators and also the field of valves or conduits for controlling a flow of gas on a gas cylinder, or a flow of liquid in a hydraulic turbine.

BACKGROUND

Prior art patent document published US 2016/0301290 A1 discloses an electric generator comprising a housing, a disk-shaped rotor, a ring-shaped permanent magnet disposed on one side of the rotor and a series of coils disposed on the other side of the rotor. The rotor comprises a series of holes so that the rotor, upon rotation, varies the magnetic flux in the coils and thereby generates electromotive forces in said coils, providing an electrical power output. The housing encloses the rotor, the permanent magnet and the coils, so as to protect and hold them together. An input shaft supporting the rotor protrudes from the housing and can be mechanically coupled to any kind of power source.

The above construction is interesting in that it provides a compact and light electric generator. Also, the rotor can be very light and therefore show a reduced rotational inertia. However this construction is not particularly suitable for being integrated into a device with the power source. More particularly, when the power source is a flow of a fluid under pressure, the transmission of mechanical power from the fluid to the generator present shortcomings, essentially in that a rotary sealing is to be provided at the shaft that outputs the power. Such a sealing generates frictional forces on the shaft and also is subject to wear and leakage.

Prior art patent document published WO 01/47765 A1 discloses an electric generator showing similarities, at least in the functioning principle, with the generator of the preceding document. The generator is integrated in a wheel nave, e.g. of a bicycle, and comprises a series of permanent magnets arranged circumferentially in front of a rotor that is driven by rotation of the nave housing. Coils are disposed circumferentially in front of the rotor on the opposite side to the permanent magnets. The rotor shows arms so that the rotation of the rotor changes the magnetic flux in the coils generated by the permanent magnets, thereby generating electromotive forces in said coils and providing an electrical power output. This generator is particularly conceived for being integrated in a wheel nave supported by a fixed axle. This renders the generator not quite suitable for other applications, e.g. for collecting power from a flow of fluid.

SUMMARY

The invention has for technical problem to provide an electric generator that overcomes at least one drawback of the above cited prior art. More particularly, the invention has for technical problem to provide an electric generator that is compact, that shows a reduced friction torque and that is suitable for being driven by a flow of fluid that is potentially under pressure.

The invention is directed to an electric generator comprising: a rotor housing; a rotor mounted in the rotor housing, with two opposed main faces; permanent magnets circumferentially arranged in front of one of the main faces of the rotor; coils circumferentially arranged in front of the other one of the main faces of the rotor; the rotor being configured for, upon rotation, vary a magnetic flux through the coils produced by the permanent magnets, so as to generate electromotive forces in said coils; wherein the coils are arranged outside of the rotor housing.

According to an exemplary embodiment, the permanent magnets are arranged outside of the rotor housing.

According to an exemplary embodiment, the rotor housing is disk-shaped with two opposed main outer faces, the coils being arranged on one of the faces.

According to an exemplary embodiment, the generator further comprises a disk of ferromagnetic material covering a face of the coils that is opposed to the rotor housing. A ferromagnetic material is to be understood as a material with a relative magnetic permeability of at least 100, in various instances at least 1000.

According to an exemplary embodiment, the permanent magnets are arranged on the other one of the two opposed main outer faces of the rotor housing.

According to an exemplary embodiment, the generator further comprises additional coils circumferentially arranged between the permanent magnets and the other outer face of the rotor housing.

According to an exemplary embodiment, the coils are wound around axes that are parallel, or at least form an angle of less than 45°, with the rotation axis of the rotor.

Advantageously, the coils are generally flat, in particular are printed on a disk of electrically insulating material.

According to an exemplary embodiment, the coils form hollow spaces that are filled with elements of ferromagnetic material. A ferromagnetic material is to be understood as a material with a relative magnetic permeability of at least 100, in various instances at least 1000.

According to an exemplary embodiment, the elements of ferromagnetic material are attached or unitary with the disk of ferromagnetic material.

According to an exemplary embodiment, the rotor housing is made of non-ferromagnetic material. By non-ferromagnetic material, a material with a relative magnetic permeability of 5 or less, in various instances 2 or less, is understood.

According to an exemplary embodiment, the permanent magnets form a Halbach array oriented so as to maximise the magnetic field towards the rotor and the coils.

According to an exemplary embodiment, the permanent magnets are attached to each other so as to form a unitary ring.

According to an exemplary embodiment, the rotor is made of ferromagnetic material with openings arranged circumferentially.

According to an exemplary embodiment, the rotor is a disk.

According to an exemplary embodiment, the generator further comprises a shaft supporting the rotor and two bearings mounted on the rotor housing and rotatably supporting the shaft.

According to an exemplary embodiment, the generator further comprises a turbine wheel supported by the shaft and located in a turbine housing with a fluid inlet and a fluid outlet, the turbine housing in various instances being in fluidic communication with the rotor housing.

According to an exemplary embodiment, the rotor forms a turbine wheel, the rotor housing forming a turbine wheel housing with a fluid inlet and a fluid outlet.

The invention is also directed to a valve for gas cylinder, comprising: a body with an inlet, an outlet and a passage interconnecting the inlet and outlet; a flow control device mounted on the body and controlling the flow of gas in the passage; wherein the valve further comprises: an electric generator with a turbine wheel located in the passage, configured for outputting electric power when the gas flow in the passage rotates the turbine wheel.

According to an exemplary embodiment, the electric generator of the valve is according to the above invention.

The invention is also directed to a conduit with a wall delimiting a passage for a fluid and with an electric generator with a turbine wheel located in the passage so as to be driven when the fluid flows, wherein the generator is according to the invention.

The invention is also directed to a use of an electric generator with a turbine wheel in a conduit for producing electricity while the fluid flows in the conduit, wherein the generator is according to the invention.

The invention is particularly interesting in that it provides a potentially very compact generator with an increased specific power, i.e. per unit of mass or volume, very low friction, and no rotating sealing. Indeed, the fact of providing the magnetic elements, i.e. essentially the permanent magnets and the coils, outside of the rotor housing allows the housing to be reduced in size and to contain a fluid driving the rotor, either directly when the rotor is shaped as a turbine, or indirectly via a shaft and a separate turbine wheel. It also avoids the difficulties in providing electrical leads that exit the rotor housing in a fluid tight manner and in an electrical insulated manner. The Halbach array for the permanent magnets is particularly interesting for it increases the magnetic flux through the coils and thereby increases the variation of the flux producing the electromotive forces in the coils. Also the presence of the additional coils between the permanent magnets and the rotor housing permits to increase the electrical energy produced albeit the magnetic flux variation in these additional coils is lower than in those arranged on the opposite side of the rotor housing.

DRAWINGS

Figure 8:
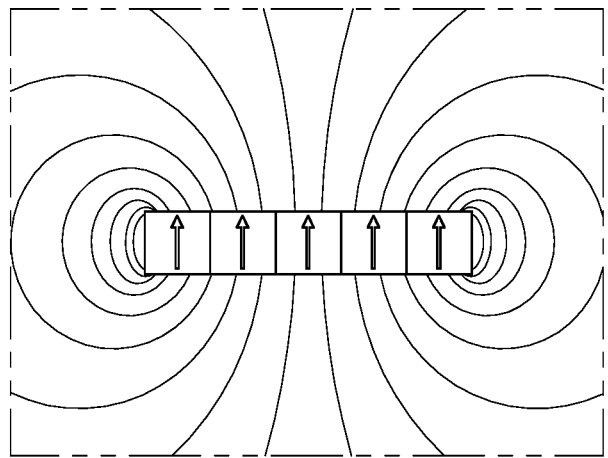

FIG. 8 exemplarily illustrates the magnetic field of a linear array of permanent magnets with a single magnetisation orientation, in accordance with various embodiments of the present invention.

Figure 9:
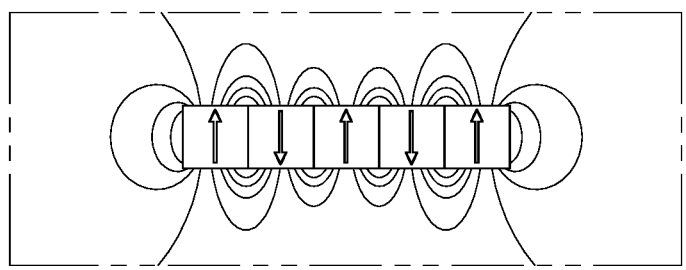

FIG. 9 exemplarily illustrates the magnetic field of a linear array of permanent magnets with an alternating array of magnetisation orientations, in accordance with various embodiments of the present invention.

Figure 10:
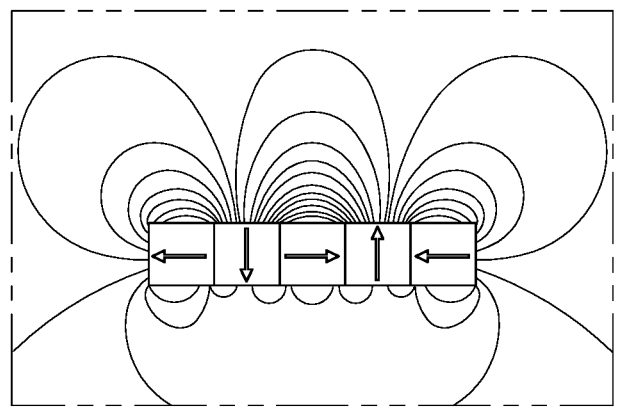

FIG. 10 exemplarily illustrates the magnetic field of a linear array of permanent magnets with a Halbach array of magnetisation orientations, in accordance with various embodiments of the present invention.

Figures 1, 2:
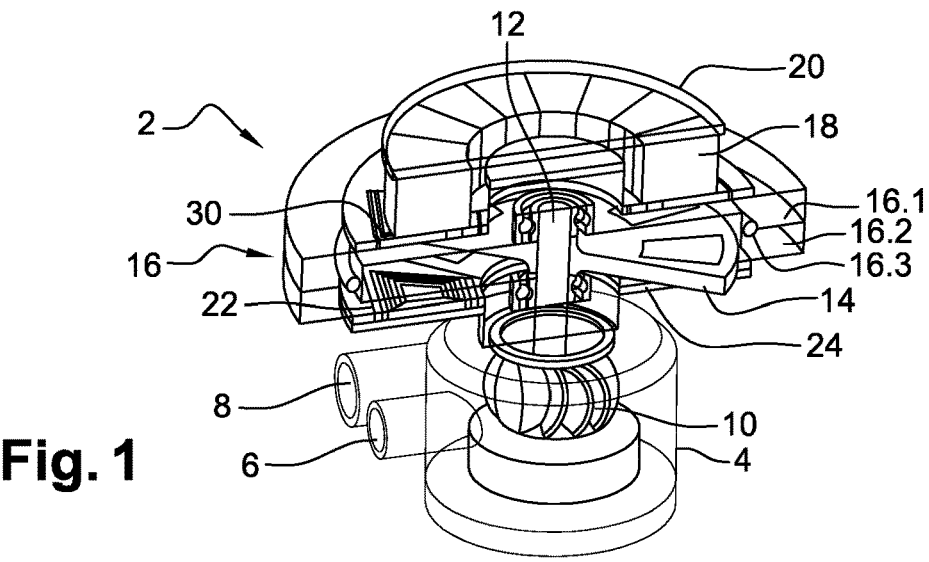
FIG. 1 is perspective illustration of an electric generator according to a first exemplary embodiment of the invention.
FIG. 2 is an exploded sectional view of the electric generator of FIG. 1, in accordance with various embodiments of the present invention.
Figure 11:
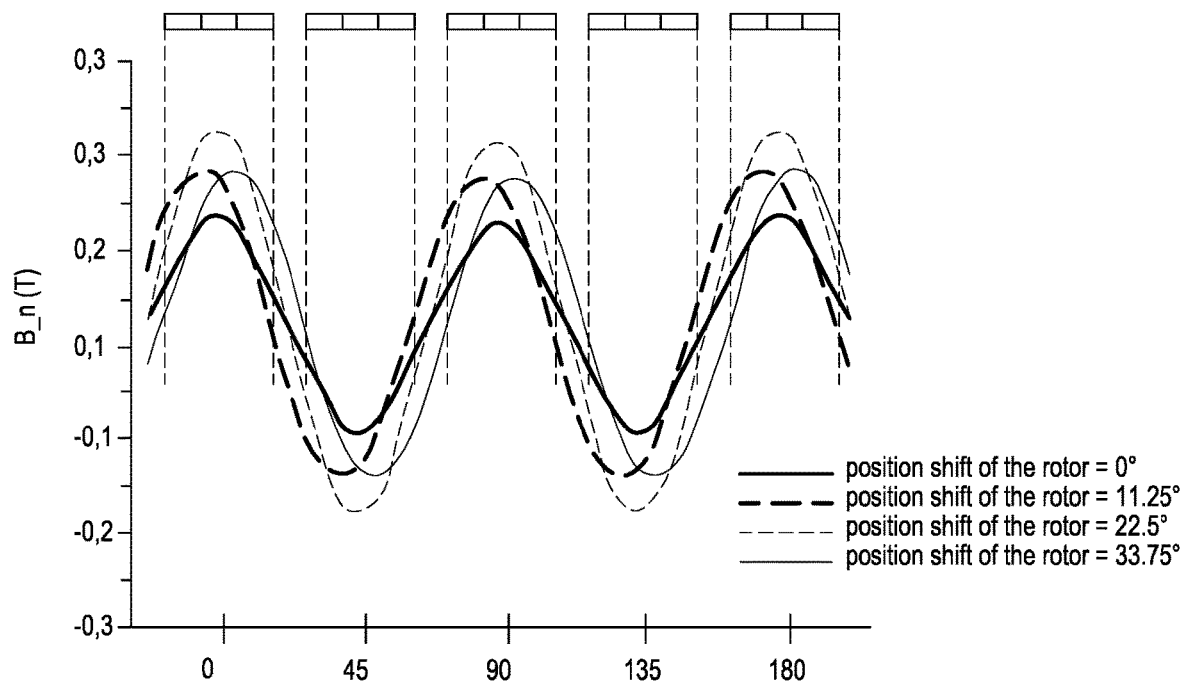

FIG. 11 is an exemplary graphic showing the normal component of the magnetic field in the lower coils, in the absence of elements of ferromagnetic material inside the coils, of the generator of FIGS. 1 and 2, for different angular positions of the rotor, in accordance with various embodiments of the present invention.

Figure 12:
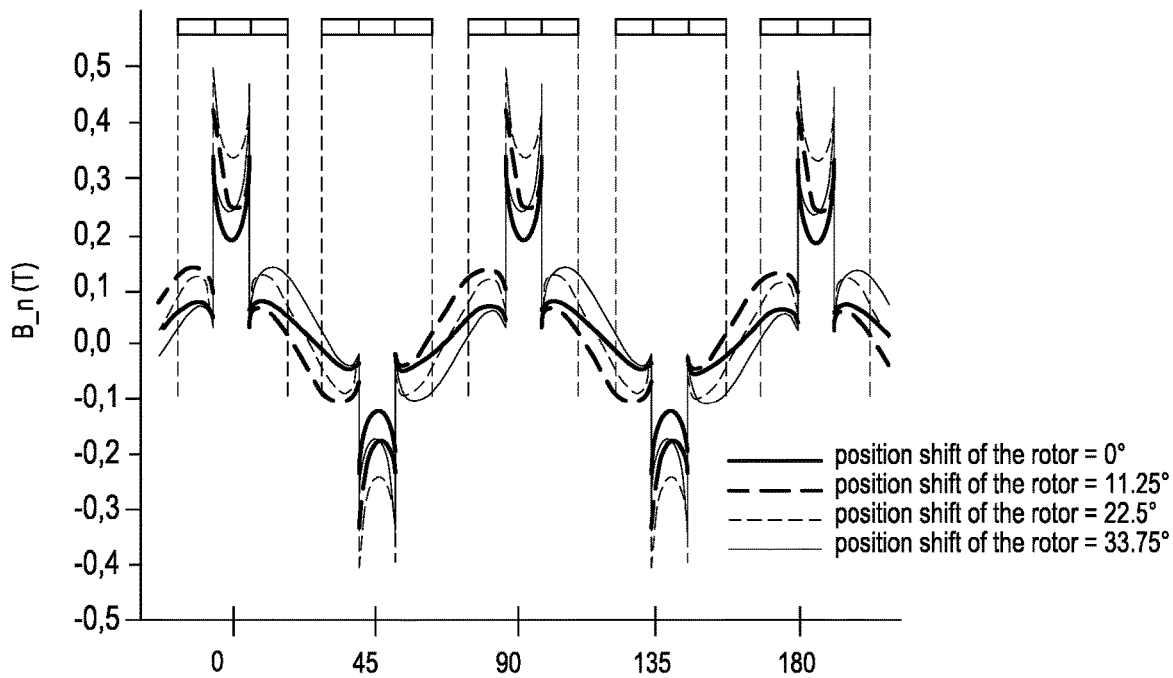

FIG. 12 is an exemplary graphic corresponding to the graphic of FIG. 11, where however elements of ferromagnetic material are present in the coils, in accordance with various embodiments of the present invention.

Figure 13:
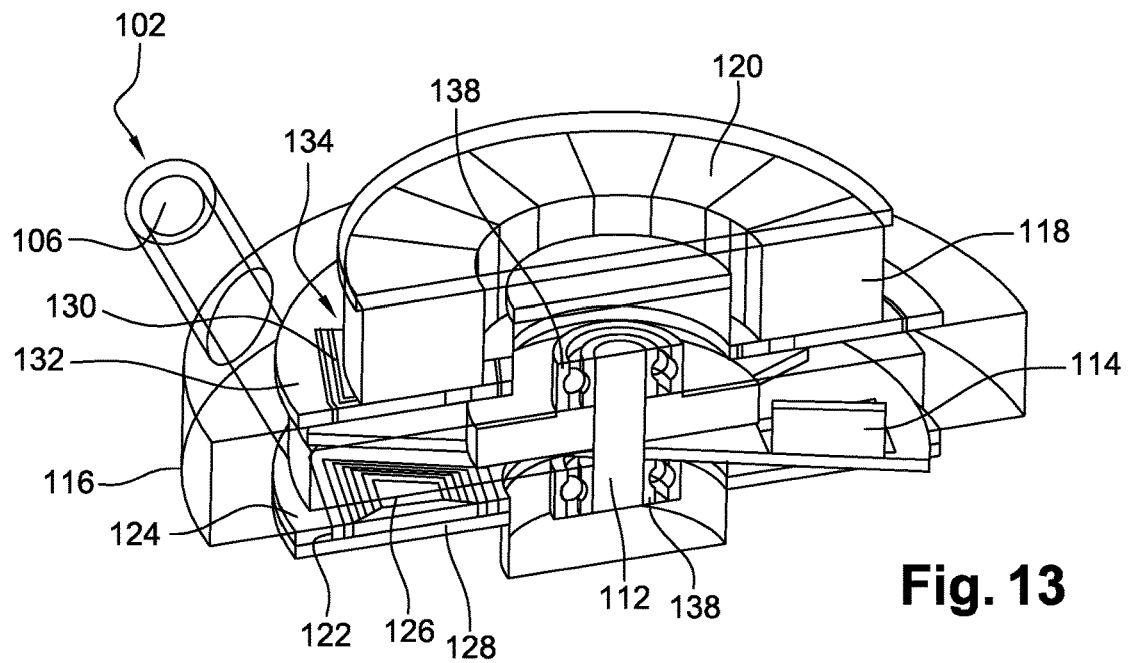

FIG. 13 is a perspective illustration of an electric generator according to a second exemplary embodiment of the invention.

Figure 14:
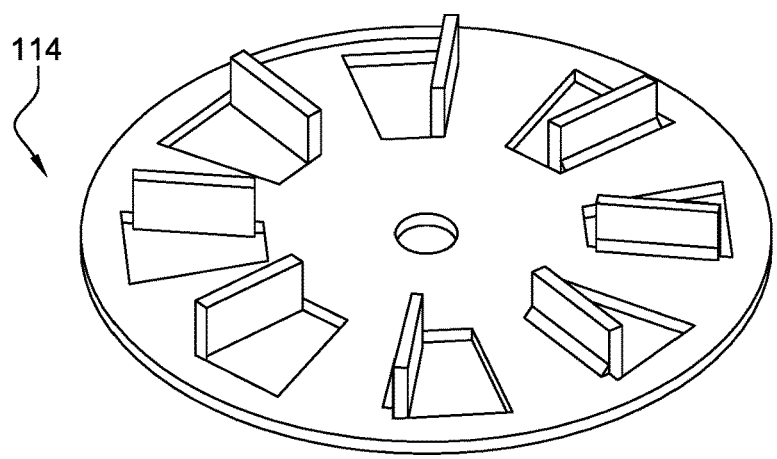

FIG. 14 is an exemplary detail perspective view of the rotor of the generator of FIG. 13, in accordance with various embodiments of the present invention.

Figure 15:
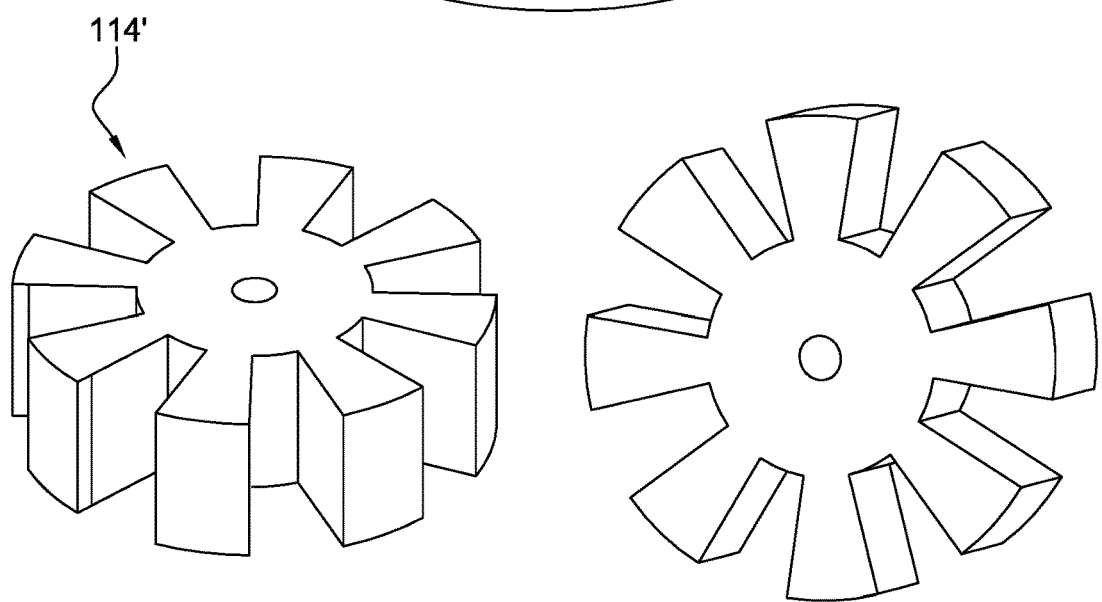

FIG. 15 exemplarily illustrates an alternative rotor for the generator of FIG. 13, in accordance with various embodiments of the present invention.

Figure 16:
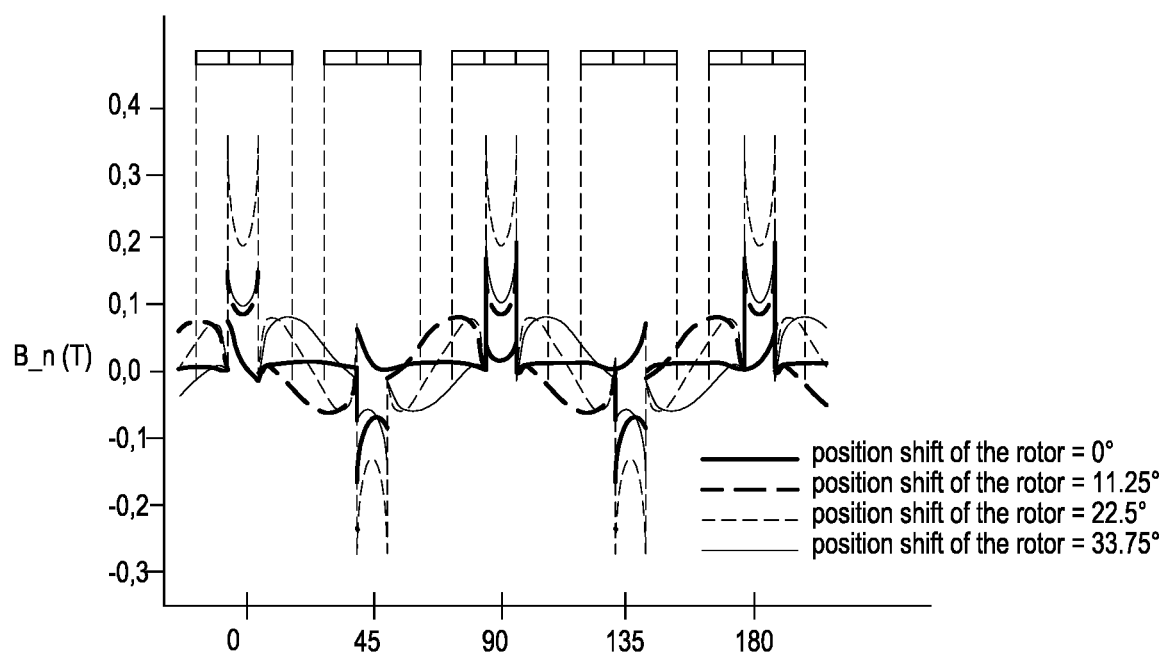

FIG. 16 is an exemplary graphic showing the normal component of the magnetic field in the lower coils, in the presence of elements of ferromagnetic material inside the coils, of the generator of FIG. 13, for different angular positions of the rotor, in accordance with various embodiments of the present invention.

Figure 17:
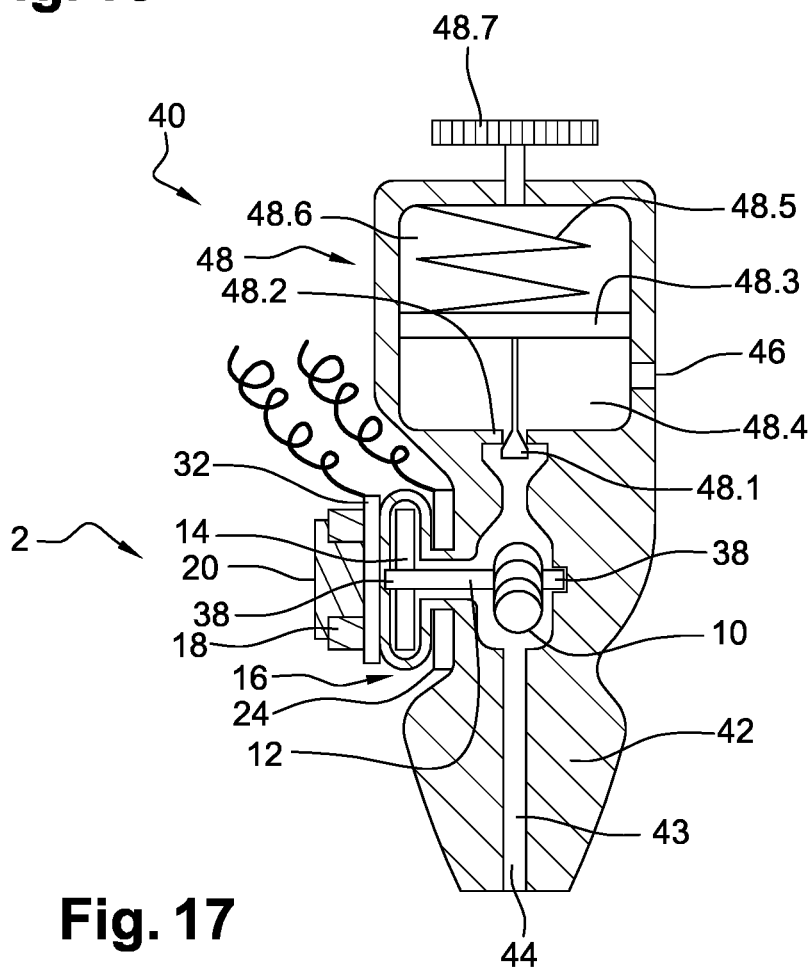

FIG. 17 illustrates a first exemplary embodiment of a valve for gas cylinder, comprising an electric generator according the first exemplary embodiment of the invention.

Figure 18:
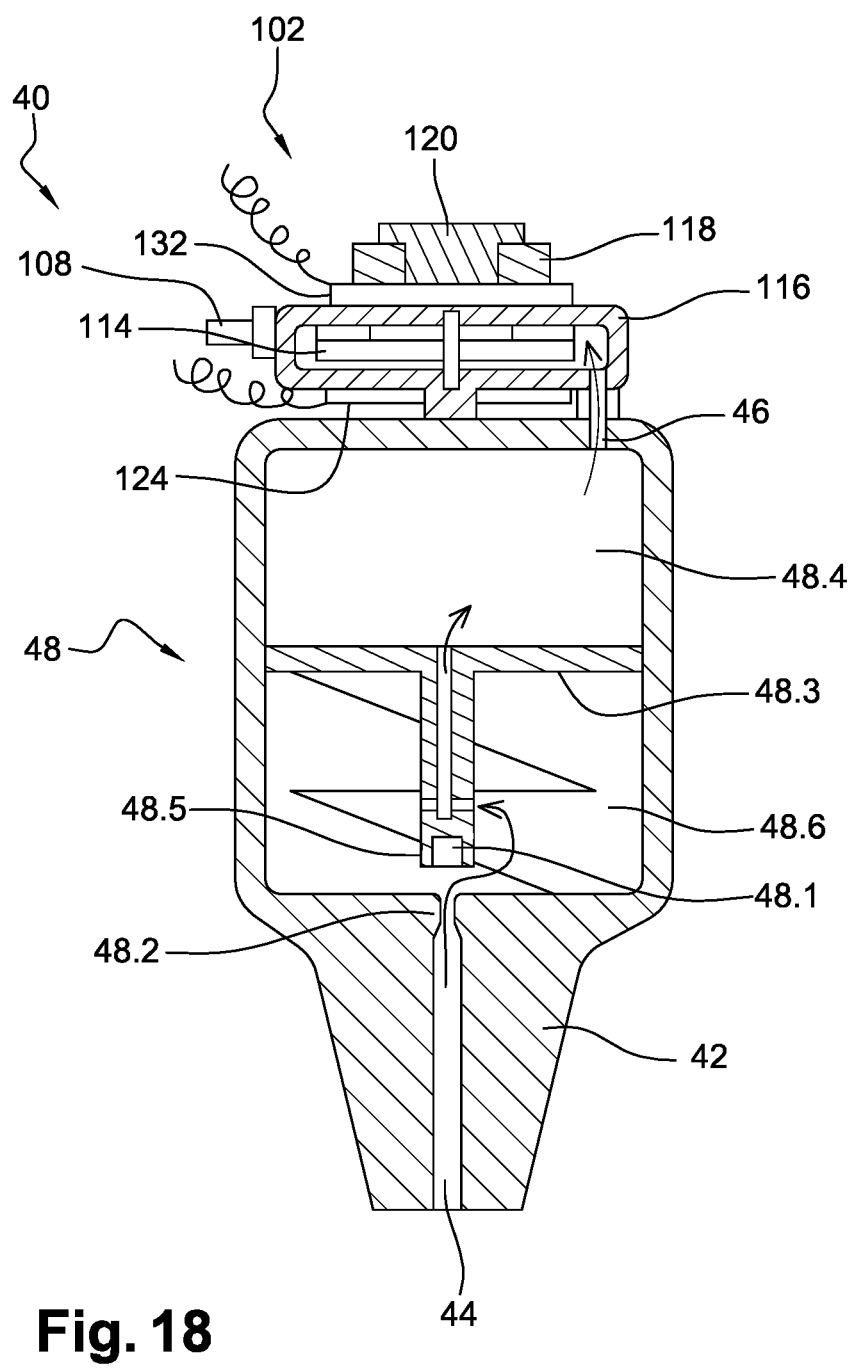

FIG. 18 illustrates a second exemplary embodiment of a valve for gas cylinder, comprising an electric generator according the second exemplary embodiment of the invention.

DETAILED DESCRIPTION

FIGS. 1 and 2 are perspective views of an electric generator according to a first embodiment of the invention.

The electric generator 2 comprises a turbine housing 4 with a fluid inlet 6 and a fluid outlet 8. The housing 4 forms a cavity housing a turbine wheel 10 which is rotatably mounted in the cavity so as to be driven by the fluid flowing from the inlet 6 to the outlet 8. For instance, the housing 4 comprises a main part 4.1 forming the cavity and comprising the inlet 6 and outlet 8, and a bottom part 4.2 closing the cavity. The fluid cavity and the turbine housing are represented in a simplified manner being understood that these can be designed differently, depending on the fluid, e.g. gas or liquid, the parameters of the flow of fluid, like flow rate, pressure, speed, etc.

The electric generator 2 comprises also a shaft 12 supporting the turbine wheel 10 and a rotor 14 housed in a rotor housing 16. That housing is mechanically coupled to the turbine housing 4, being however understood that both housings could be unitary or at least form a single housing. The shaft 12 extends through the turbine housing 4 and the rotor housing 16. The rotor housing 16 can be generally disk-shaped with two main and opposed outer faces, and be made essentially of two half-shells 16.1 and 16.2 jointed to each other and of a seal 16.3 providing fluid tightness at the junction between the half-shells.

The electric generator 2 comprises also a ring of permanent magnets 18 disposed on one of the main outer faces of the rotor housing 16, for instance on the upper face, i.e. the face that is opposed to the turbine housing 4. The permanent magnets are attached to each other for forming a unitary ring 18. The ring 18 comprises then a series of magnetic poles which are oriented such as to generate a magnetic field directed to the rotor 14. For instance, the magnetic poles can be arranged according to a Halbach array that maximizes the magnetic field on side of the ring, for instance on the side in front of the rotor housing. The Halbach array will be detailed below in connection with FIGS. 8 to 10. The ring of permanent magnets 18 can be covered on its outer side, i.e. the side opposite to the side in front of the rotor housing 16, by a plate, for instance a disk 20, of ferromagnetic material.

The electric generator 2 comprises also a series of electric coils 22 arranged circumferentially on the main side of the rotor housing 16 that is opposed to the main outer face receiving the ring of permanent magnets 18, for instance the lower side. The coils are wound around axes that are parallel, or at least form an angle of less than 45°, in various instances less than 20°, with the axis of the shaft 12. The coils can be formed as printed circuits on a board 24 of the type printed circuit board (PCB). This can be achieved by using the LIGA process which is a German acronym for "Lithographie, Galvanoformung, Abformung", i.e. Lithography, Electroplating, and Molding, that describes a fabrication technology used to create high-aspect-ratio microstructures. It is to that respect referred to Andrew S. Holmes et al. (See FIGS. 6 to 8 in "*Axial-Flux Permanent Magnet Machines for Micropower Generation*", Journal of Microelectromechanical Systems 14(1), p. 54 (2005)). Alternatively, the coils can be printed by the ECPR process, acronym for "Electrochemical Pattern Replication", as proposed by M. Fredenberg et al. ("*Novel Multi-layer Wiring Build-up using Electrochemical Pattern Replication (ECPR)*", Electronic Components and Technology Conference, 2009. ECTC 2009. 59th, DOI: 10.1109/ECTC.2009.5074072).

Elements of ferromagnetic material 26 can be placed inside the coils 22 for promoting the magnetic flux in the coils. Also a backing plate, for instance a disk 28, of ferromagnetic material can be placed on the side of the disk 24 that is opposite to the rotor housing 16, for instance on the lower side of the disk 24, also for promoting the magnetic flux in the coils 22.

Still with reference to FIGS. 1 and 2, as is apparent, additional coils 30, advantageously formed, similarly to the above, on a disk 32 and optionally with elements 34 of ferromagnetic material inside the coils, can be arranged circumferentially, similarly to the coils 22, between the ring of permanent magnets 18 and the rotor housing 16.

The rotor 14 is therefore housed in the rotor housing 16 and the housing is sandwiched essentially, on one of the main outer faces of the housing, by the ring of permanent magnets 18 and, on the other of the main outer faces of the housing, by the coils 22.

The functioning principle of the electric generator 2 is the following. The permanent magnets of the ring 18 produce a magnetic field in the direction of the rotor 14 until the coils 22. The rotor 14 is configured to influence the propagation of the magnetic flux through the coils 22 and 34. To that end, the rotor 14 can be made of magnetic material and can comprise a series of holes or openings so that, upon rotation, the magnetic field at a given position in the rotor housing 16 is alternatively in the fluid present in the housing and in ferromagnetic material. This means that the magnetic circuit that allows the development of magnetic field the coils 22, and optionally 30, shows a variation in time of the global permeability, leading to a variation of the magnetic flux in the coils and thereby electromotive forces producing an electrical power output.

As this is apparent in FIGS. 1 and 2, the cavity of the turbine housing 4 is in fluidic communication with the cavity of the rotor housing 16, so that the fluid driving the turbine wheel 10 is also present in the rotor housing 16 and in contact with the rotor 14. This means that no particular rotating sealing is to be provided on the shaft 12. This provides a substantial advantage in that the frictional forces that inevitably result of such a sealing are not present. Also the risk of having a leakage at such a sealing and the necessary maintenance are avoided. The rotor housing 16 is fastened to the turbine housing 4 in a fluid tight fashion by means of the seal 36.

The shaft 12 is supported by three bearings 38, one being housed by the bottom portion 4.2 of the turbine housing, and the other two being housed by the rotor housing 16, for instance by each of the two half-shells 16.1 and 16.2 of the housing, being however understood that other configurations are possible.

FIGS. 3 to 7 illustrate the main stacked elements of the electric generator of FIGS. 1 and 2.

Figure 3:
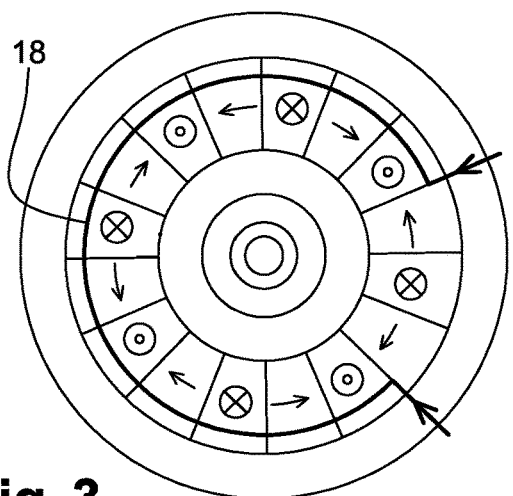
FIG. 3 is a plan view of the disk of permanent magnets of the generator of FIGS. 1 and 2, in accordance with various embodiments of the present invention.

FIG. 3 illustrates the ring of permanent magnets 18. As is apparent, the ring 18 comprises for instance 16 poles, i.e. 16 permanent magnets with different magnetisation orientations attached to each other so as to form the ring 18. The magnetisation orientations are illustrated and we can observe that the orientation is systematically rotated by 90° when passing from one magnet to the next one, corresponding to a Halbach array. With such a configuration, the magnetic field is maximised on one side of the array of magnets.

Figure 4:
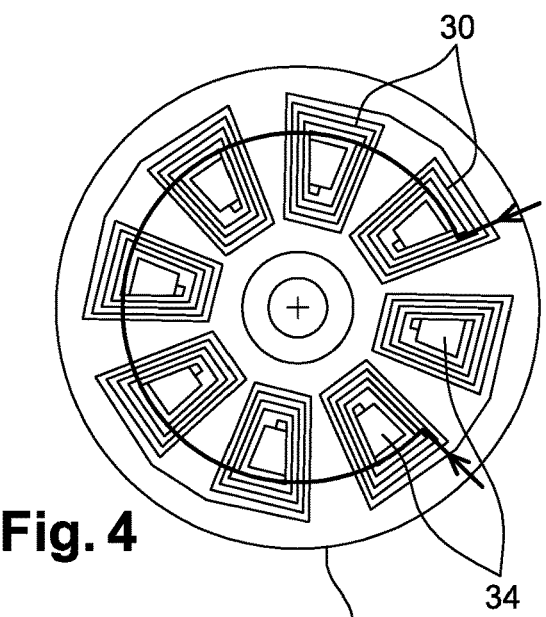
FIG. 4 is a plan view of the upper coils disk of the generator of FIGS. 1 and 2, in accordance with various embodiments of the present invention.

FIG. 4 illustrates the additional coils 30 provided on the disk 32 and optionally provided with the elements 34 of ferromagnetic material inside the coils.

Figure 5:
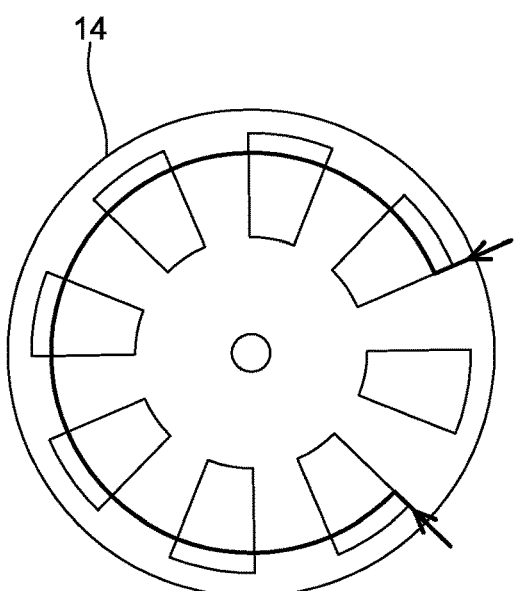
FIG. 5 is a plan view of the rotor of the generator of FIGS. 1 and 2, in accordance with various embodiments of the present invention.

FIG. 5 illustrates the disk-shaped rotor 14 provided with openings arranged circumferentially.

Figure 6:
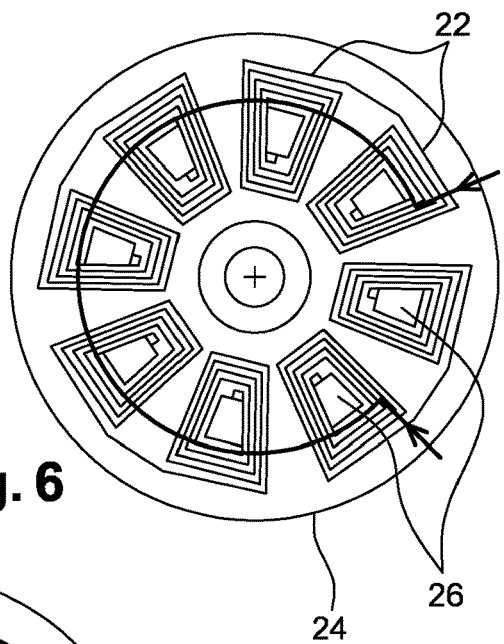
FIG. 6 is a plan view of the lower coils disk of the generator of FIGS. 1 and 2, in accordance with various embodiments of the present invention.

FIG. 6 illustrates the additional coils 22 provided on the disk 24 and optionally provided with the elements 26 of ferromagnetic material inside the coils.

Figure 7:
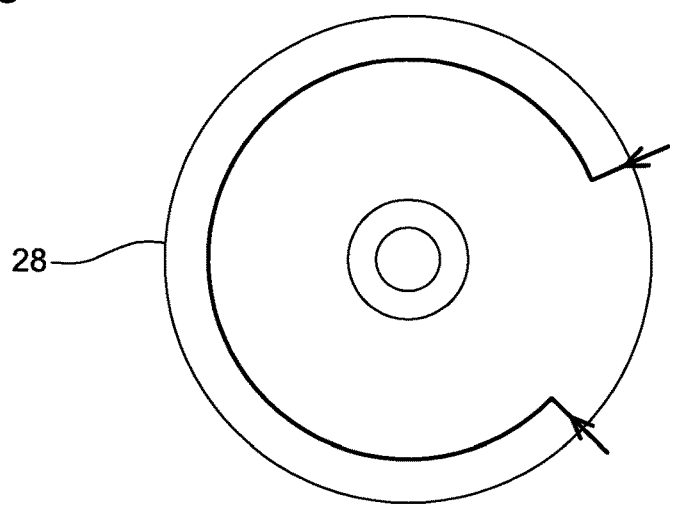
FIG. 7 is a plan view of the lower disk of ferromagnetic material of the generator of FIGS. 1 and 2, in accordance with various embodiments of the present invention.

FIG. 7 illustrates the optional backing disk 28 of ferromagnetic material.

FIGS. 8 to 10 illustrate in a comparative manner the production of magnetic field with a single pole linear array of permanent magnets, a multipole linear array of permanent magnets with alternating polarity and a multipole linear array of permanent magnets with a Halbach array.

FIG. 8 illustrates the lines of the magnetic field produced by a permanent magnet with a single pole orientation, for instance a linear juxtaposition of permanent magnets where the magnetization directions of the magnets are parallel and show the same orientation perpendicular to the linear arrangement. As is apparent, the magnetic field is symmetric relative to a plane extending centrally through the magnet along the linear direction (horizontal in FIG. 8), essentially because the magnetic field lines form loops around the two opposites ends of the magnet.

FIG. 9 illustrates the lines of the magnetic field produced by a multipole permanent magnet where the poles are alternating. More specifically, the permanent magnet is formed by a linear juxtaposition of a series of permanent magnets where the magnetisation orientations alternate. We can observe that the intensity of the alternating magnetic field is identical on both main sides of the magnet and that the field is horizontally alternating compared with the permanent magnet of FIG. 8 with a single pole orientation.

FIG. 10 illustrates a permanent magnet of the same size and shape as those of FIGS. 8 and 9, showing however a Halbach array. A Halbach array is a special arrangement of permanent magnets that augments the magnetic field close to a factor of two on one side of the array (compared to the multipole permanent magnet of FIG. 9) while canceling the field to near zero on the other side. This is achieved by having a spatially rotating pattern of magnetisation. The rotating pattern of permanent magnets (on the front face; on the left, up, right, down) can be continued indefinitely and have the same effect. Such an arrangement is as such known to the skilled person and therefore does not need to be developed further. In FIG. 10, we can observe that the magnetisation directions of the permanent magnets that are juxtaposed along the main direction successively change by a rotation of 90°. We can also observe that the magnetic field is more developed on one side, for instance the upper side, than on the other side, for instance the lower side.

FIGS. 11 and 12 illustrate, with graphs, curves corresponding to the normal component of the magnetic field B_n (expressed in Tesla) produced inside the coils arranged on the opposite side to the ring of permanent magnets (see references 22 and 18 in FIGS. 1 and 2) for different angular positions of the rotor, i.e. 0°, 11.25°, 22.5° and 33.75°. The normal component is relative to the mean plane of the coils, i.e. corresponds to the axis of the coils. Each curve corresponds to an angular position of the rotor and each maximum or minimum corresponds to a coil. For instance, five coils are schematically represented at the top of the graphs in correspondence with the maxima and minima.

In FIG. 11, the coils are void of the ferromagnetic elements 26 as illustrated in FIGS. 2 and 6. We can observe that the maximum variation of the normal component of the magnetic field in the coils is of about 0.1 Tesla.

In FIG. 12, the coils comprise the ferromagnetic elements 26 as illustrated in FIGS. 2 and 6. We can observe that the maximum variation of the normal component of the magnetic field in the coils is of about 0.15 Tesla, i.e. about 0.05 Tesla more than without the ferromagnetic elements inside the coils.

FIGS. 13 to 15 illustrate in perspective an electric generator according to a second embodiment of the invention. The reference numbers of the first embodiment are used for designating the same or corresponding elements whereas these numbers are incremented by 100. Reference is made to the description of these elements in relation with the first embodiment.

The electric generator 102 illustrated in FIG. 13 differs from the electric generator of FIGS. 1 and 2 essentially in that the turbine wheel and the magnetic rotor are merged and similarly that the turbine wheel housing and the rotor housing are merged. More specifically, the electric generator 102 comprises a single housing 116 in which the rotor 114 is rotatably mounted. The rotor housing 116 is advantageously generally disk-shaped with two opposed main outer faces onto which the different magnetic components are placed, similarly as in the electric generator of FIGS. 1 and 2. The ring of permanent magnets 118 and the optional cover disk 120 of ferromagnetic material are placed on one of the two main outer faces of the housing 116 whereas the coils 122, in various instances on a disk 124, are arranged circumferentially on the other main outer face of the housing 116. Similarly, to the first embodiment, a backing disk 128 of ferromagnetic material can be placed on the outer side of the coils 122. Also additional coils 130, in various instances on a disk 132, can be arranged circumferentially between the magnet ring 118 and the housing 116. Also, the rotor 114 is designed to be able to be driven by a flow of fluid and, upon rotation, vary the magnetic flux through the coils.

FIG. 14 is a detail view of the rotor 114 of the generator of FIG. 13. For instance, the rotor 114 is a disk of ferromagnetic material with openings and with blades extending from the disk. The opening distributed circumferentially generate a variation of permeability for the magnetic field and therefore a variation of the magnetic flux in the coils. The blades cooperate with the fluid so as to drive the disk in rotation. For instance, the blades can be formed by cutting and thereafter bending the disk, thereby forming at the same time the openings and the blades.

FIG. 15 illustrates in perspective a rotor 114' according to an alternative to the rotor 114 illustrated in FIG. 14. The rotor is thicker and shows only openings, i.e. no blades protruding from the mean plane of the rotor anymore.

FIG. 16 illustrates, with a graph, curves corresponding to the normal component of the magnetic field B_n (expressed in Tesla) produced inside the coils arranged on the opposite side to the ring of permanent magnets (see references 122 and 118 in FIG. 13) for different angular positions of the rotor, i.e. 0°, 11.25°, 22.5° and 33.75°. The normal component is relative to the mean plane of the coils, i.e. corresponds to the axis of the coils. Each curve corresponds to an angular position of the rotor and each maximum or minimum corresponds to a coil. For instance, five coils are schematically represented at the top of the graphs in correspondence with the maxima and minima. The coils comprise the elements 126 of ferromagnetic material placed inside the coils.

We can observe that the maximum variation of the normal component of the magnetic field in the coils is of about 0.2 Tesla.

Generally speaking, a ferromagnetic material shows a relative permeability that is higher than 100, in various instances higher than 1000. A non-ferromagnetic material shows a relative permeability that is lower than 5, in various instances lower than 2 and for example close to 1.

Still generally speaking, the material for the permanent magnet ideally show a strong remanent magnetic induction Br and a strong coercive magnetic field Hc to avoid demagnetization. Ideally, we can use NdFeB (neodymium iron boron) or SmCo (samarium cobalt) to maximize the magnetic energy. For instance, NdFeB N52 can be selected, whose residual induction is 1.43 T, an energy product B.H of 415 kJ/m3 and a relative permeability of 1.05 with a maximum operating temperature of 70° C. Alternatively, AlNiCo magnets fabricated by foundry can be used to realize vibration and mechanical chock resistant generators with high temperature working until 400° C. Ferrite magnets can be used for low cost generators with lower magnetic performances. These magnet materials are as such known of the person skilled in the art.

FIGS. 17 and 18 illustrate two embodiments of a valve to which an electric generator according to the present invention has been integrated. More specifically, FIG. 17 is a schematic sectional view of a valve for a gas cylinder, according to a first embodiment, incorporating an electric generator according to the first embodiment illustrated in FIG. 1. FIG. 18 is a schematic sectional view of a valve similar to the valve of FIG. 17, according to a second embodiment, incorporating an electric generator also according to the second embodiment illustrated in FIG. 13.

In FIG. 17, the valve 40 comprises a body 42 with a gas passage 43 interconnecting a gas inlet 44 with a gas outlet 46 on the body. The valve comprises a pressure reducer 48 that comprises a shutter 48.1 cooperating with a seat 48.2 where both are arranged in the gas passage 43 for shutting-off the passage. The pressure reducer 48 comprises also a piston 48.3 mechanically linked to the shutter 48.1 and slidable in a bore formed in the body 42. The piston 48.3 delimits with the bore in the body 43 a regulating chamber 48.4 that is downstream of the shutter 48.1 and its seat 48.2, and a chamber 48.6 housing a spring 48.5 that elastically biases the piston 48.3 in a direction that acts on the shutter 48.1 so as to open the gas passage 43 in the seat 48.2. The construction of the regulating valve described here above is as such well known to the skilled person.

As is apparent in FIG. 17, the electric generator 2 that is integrated in the valve 40 is located in the high pressure part of the gas passage 43, i.e. upstream of the shutter 48.1 and the seat 48.2. As is apparent, a cavity, such as a bore, has been formed in the body for receiving the rotor assembly of the generator, i.e. essentially the shaft 12 carrying the turbine wheel 10 and the rotor 14. A first bearing 38 is formed in the body for supporting the inner end of the shaft 12. The cavity in the body is closed in a gas tight fashion by the housing 16 that forms a second bearing for the outer end of the shaft 12. The coils on the boards 24 and 32 of the stator are then outside of the gas passage 43 of the valve and can be easily connected to any kind of electric or electronic device associated with the valve 40.

Still with reference to FIG. 17, the turbine wheel 10 is located in the gas passage 43 such as to be driven by the flow of gas in the passage when the regulator 48 is open. More specifically, flow guiding means can be provided in the passage directly upstream of the turbine wheel 10 in order to accelerate the fluid properly with regard to the design of the turbine wheel 10 so as to maximize the transfer of energy to the wheel.

The integration of an electric generator according to the second embodiment in FIG. 13 is also possible, similarly to FIG. 17.

In FIG. 18, the valve 40 is similar to the one of FIG. 17; however, the electric generator 102 is here in the low pressure part of the valve, i.e. downstream of the shutter 48.1 and the seat 48.2 of the pressure regulator 48. Also the pressure regular is somehow different from the one of FIG. 17 in that the shutter 48.1 is located downstream of the gas passage in the seat 48.2 and in that the regulating chamber is delimited by a face of the piston 48.3 which is opposite to the shutter 48.1.

The invention claimed is:

1. An electric generator, said generator comprising:
    a rotor housing;
    a rotor mounted in the rotor housing, with two opposed main faces;
    permanent magnets circumferentially arranged in front of one of the main faces of the rotor;
    coils circumferentially arranged in front of the other one of the main faces of the rotor;
    wherein the rotor is configured for, upon rotation, vary a magnetic flux through the coils produced by the permanent magnets, so as to generate electromotive forces in the coils;
    wherein the coils are arranged outside of the rotor housing.

2. The electric generator according to claim 1, wherein the permanent magnets are arranged outside of the rotor housing.

3. The electric generator according to claim 1, wherein the rotor housing is disk-shaped with two opposed main outer faces, the coils being arranged on one of the faces.

4. The electric generator according to claim 3, further comprising a disk of ferromagnetic material covering a face of the coils that is opposed to the rotor housing.

5. The electric generator according to claim 3, wherein the permanent magnets are arranged on the other one of the two opposed main outer faces of the rotor housing.

6. The electric generator according to claim 5, further comprising additional coils circumferentially arranged between the permanent magnets and the other outer face of the rotor housing.

7. The electric generator according to claim 1, wherein the coils are wound around axes that are at least one of parallel, and form an angle of less than or equal to 45°, with the rotation axis of the rotor.

8. The electric generator according to claim 1, wherein the coils form hollow spaces that are filled with elements of ferromagnetic material.

9. The electric generator according to claim 8, wherein the elements of ferromagnetic material are attached or unitary with the disk of ferromagnetic material.

10. The electric generator according to claim 1, wherein the rotor housing is made of non-ferromagnetic material.

11. The electric generator according to any one of claim 1, wherein the permanent magnets form a Halbach array oriented so as to maximise the magnetic field towards the rotor and the coils.

12. The electric generator according to claim 1, wherein the permanent magnets are attached to each other so as to form a unitary ring.

13. The electric generator according to claim 1, wherein the rotor is made of ferromagnetic material with openings arranged circumferentially.

14. The electric generator according to claim 1, wherein the rotor is a disk.

15. The electric generator according to claim 1, further comprising a shaft supporting the rotor and two bearings mounted on the rotor housing and rotatably supporting the shaft.

16. The electric generator according to claim 15, further comprising a turbine wheel supported by the shaft and located in a turbine housing with a fluid inlet and a fluid outlet, the turbine housing preferably being in fluidic communication with the rotor housing.

17. The electric generator according to claim 15, wherein the rotor forms a turbine wheel, the rotor housing forming a turbine housing with a fluid inlet and a fluid outlet.

18. A valve for gas cylinder, said valve comprising:
    a body with an inlet, an outlet and a passage interconnecting the inlet and outlet;
    a flow control device mounted on the body and controlling the flow of gas in the passage;
    an electric generator with a turbine wheel located in the passage, configured for outputting electric power when the gas flow in the passage rotates the turbine wheel;

wherein the electric generator comprises:
a rotor housing;
a rotor mounted in the rotor housing, with two opposed main faces;
permanent magnets circumferentially arranged in front of one of the main faces of the rotor;
coils circumferentially arranged in front of the other one of the main faces of the rotor;
wherein the rotor is configured to, upon rotation, vary a magnetic flux through the coils produced by the permanent magnets, so as to generate electromotive forces in the coils; and
wherein the coils are arranged outside of the rotor housing.

19. A conduit with a wall delimiting a passage for a fluid and with an electric generator with a turbine wheel located in the passage so as to be driven when the fluid flows, wherein the electric generator comprises:
a rotor housing;
a rotor mounted in the rotor housing, with two opposed main faces;
permanent magnets circumferentially arranged in front of one of the main faces of the rotor;
coils circumferentially arranged in front of the other one of the main faces of the rotor;
wherein the rotor is configured for, upon rotation, vary a magnetic flux through the coils produced by the permanent magnets, so as to generate electromotive forces in the coils; and
wherein the coils are arranged outside of the rotor housing.

\* \* \* \* \*